(12) United States Patent
Becker et al.

(10) Patent No.: US 12,022,906 B2
(45) Date of Patent: Jul. 2, 2024

(54) PROTECTIVE HELMET WITH AN ANTENNA

(71) Applicant: Schuberth GmbH, Magdeburg (DE)

(72) Inventors: Jan-Christian Becker, Niederndodeleben (DE); Thomas Schulz, Koenigslutter am Elm (DE); Christian Dittmer-Peters, Koenigslutter (DE); Markus Moebius, Welsleben (DE); Thomas Hagemeier, Magdeburg (DE)

(73) Assignee: SCHUBERTH GMBH, Magdeburg (DE)

( * ) Notice: Subject to any disclaimer, the term of this patent is extended or adjusted under 35 U.S.C. 154(b) by 0 days.

(21) Appl. No.: 16/328,375

(22) PCT Filed: Aug. 23, 2017

(86) PCT No.: PCT/EP2017/071259
§ 371 (c)(1),
(2) Date: Feb. 26, 2019

(87) PCT Pub. No.: WO2018/037055
PCT Pub. Date: Mar. 1, 2018

(65) Prior Publication Data
US 2019/0387829 A1 Dec. 26, 2019
US 2020/0383418 A9 Dec. 10, 2020

(30) Foreign Application Priority Data
Aug. 26, 2016 (DE) .................... 10 2016 115 889.5

(51) Int. Cl.
*A42B 3/30* (2006.01)
*A42B 3/04* (2006.01)
(Continued)

(52) U.S. Cl.
CPC .............. *A42B 3/30* (2013.01); *A42B 3/0493* (2013.01); *A42B 3/16* (2013.01); *H01Q 1/276* (2013.01);
(Continued)

(58) Field of Classification Search
CPC ........... A42B 3/30; A42B 3/0493; A42B 3/16; A42B 3/04; A42B 3/0413; A42B 3/042;
(Continued)

(56) References Cited

U.S. PATENT DOCUMENTS 3,422,224 A 1/1969 Curran
3,470,558 A 9/1969 Raschke
(Continued)

FOREIGN PATENT DOCUMENTS

CN 2540799 Y 3/2003
CN 1627651 A 6/2005
(Continued)

OTHER PUBLICATIONS

Wikipedia, Wireless Personal Area Network, https://de.wikipedia.org/w/index.php?title=Wireless_Personal_Area_Network, printed Mar. 27, 2018, 4 pages.
(Continued)

*Primary Examiner* — Khaled Annis
*Assistant Examiner* — Dakota Marin
(74) *Attorney, Agent, or Firm* — McCarter & English, LLP

(57) ABSTRACT

The invention relates to a protective helmet, and in particular, to a protective motorcycle helmet, comprising an antenna (1) for radio transmission, an outer shell (2) for distributing impact forces, an inner layer (3), which is accommodated by the outer shell (2), for damping impact forces, and a socket (4), which is firmly connected to the outer shell (2), for contacting a digital device (5) for wireless
(Continued)

communication, wherein the socket (4), when contacting the digital device (5), electrically connects the latter to the antenna (1) for wireless communication. The protective helmet is characterized in that at least a partial layer of the outer shell (2) is disposed between the antenna (1) and the inner layer (3).

19 Claims, 4 Drawing Sheets

(51) Int. Cl.
| | |
|---|---|
| A42B 3/16 | (2006.01) |
| H01Q 1/27 | (2006.01) |
| H01Q 9/16 | (2006.01) |
| H04B 1/034 | (2006.01) |
| A42B 1/24 | (2021.01) |
| A42B 1/242 | (2021.01) |
| A42B 1/244 | (2021.01) |
| A42B 1/245 | (2021.01) |
| A42B 1/247 | (2021.01) |

(52) U.S. Cl.
CPC ............. *H01Q 9/16* (2013.01); *H04B 1/0343* (2013.01); *A42B 1/24* (2013.01); *A42B 1/242* (2013.01); *A42B 1/244* (2013.01); *A42B 1/245* (2013.01); *A42B 1/247* (2013.01); *A42B 3/04* (2013.01); *A42B 3/0413* (2013.01); *A42B 3/042* (2013.01); *A42B 3/0426* (2013.01); *A42B 3/0433* (2013.01); *A42B 3/044* (2013.01)

(58) Field of Classification Search
CPC ..... A42B 3/0426; A42B 3/0433; A42B 3/044; A42B 1/24; A42B 1/242; A42B 1/244; A42B 1/245; A42B 1/247; H01Q 1/276; H01Q 9/16; H01Q 1/0343; H04B 1/0343
USPC ............................................................ 2/422
See application file for complete search history.

(56) References Cited

U.S. PATENT DOCUMENTS

| | | | | |
|---|---|---|---|---|
| 3,582,951 | A | 6/1971 | Altmayer | |
| 3,885,246 | A | 5/1975 | Tung | |
| 3,963,917 | A | 6/1976 | Romano | |
| 3,977,003 | A * | 8/1976 | Kershaw | A42B 3/30 |
| | | | | 343/702 |
| 4,077,007 | A * | 2/1978 | McKinney | A42B 3/30 |
| | | | | 455/142 |
| 4,109,105 | A | 8/1978 | Von Statten, Jr. | |
| 4,130,803 | A * | 12/1978 | Thompson | A42B 3/30 |
| | | | | 455/344 |
| 4,152,553 | A | 5/1979 | White | |
| 4,178,411 | A | 12/1979 | Cole et al. | |
| 4,239,106 | A | 12/1980 | Aileo | |
| 4,321,433 | A | 3/1982 | King | |
| 4,357,711 | A * | 11/1982 | Drefko | A42B 3/30 |
| | | | | 2/422 |
| 4,400,591 | A | 8/1983 | Jennings et al. | |
| 4,466,138 | A | 8/1984 | Gessalin | |
| 4,519,099 | A | 5/1985 | Kamiya et al. | |
| 4,563,392 | A | 1/1986 | Harpell et al. | |
| 4,719,462 | A | 1/1988 | Hawkins | |
| 4,729,132 | A * | 3/1988 | Fierro | A42B 3/30 |
| | | | | 2/171.4 |
| 4,833,726 | A * | 5/1989 | Shinoda | A42B 3/30 |
| | | | | 381/376 |
| 4,903,350 | A * | 2/1990 | Gentes | A42B 3/0493 |
| | | | | 2/421 |
| 4,950,439 | A | 8/1990 | Smith et al. | |
| 5,119,505 | A * | 6/1992 | Tisseront | A42B 3/30 |
| | | | | 455/350 |
| 5,136,567 | A | 8/1992 | Nagahara et al. | |
| 5,136,657 | A | 8/1992 | Hattori | |
| 5,142,700 | A * | 8/1992 | Reed | A42B 3/30 |
| | | | | 2/422 |
| 5,183,701 | A | 2/1993 | Jacobs et al. | |
| 5,291,203 | A | 3/1994 | Schneck | |
| 5,327,588 | A | 7/1994 | Garneau | |
| 5,329,637 | A | 7/1994 | Walker | |
| 5,357,409 | A | 10/1994 | Glatt | |
| 5,438,702 | A | 8/1995 | Jackson | |
| 5,448,780 | A * | 9/1995 | Gath | A42B 3/08 |
| | | | | 2/411 |
| 5,508,900 | A | 4/1996 | Norman | |
| 5,615,410 | A | 3/1997 | DeMars | |
| 5,683,831 | A | 11/1997 | Baril et al. | |
| 5,718,004 | A | 2/1998 | Broersma et al. | |
| 5,743,621 | A | 4/1998 | Mantha et al. | |
| 5,749,096 | A | 5/1998 | Fergason et al. | |
| 5,862,528 | A | 1/1999 | Saijo et al. | |
| 5,886,667 | A | 3/1999 | Bondyopadhayay | |
| 5,931,559 | A | 8/1999 | Pfaeffle | |
| 5,996,128 | A * | 12/1999 | Yanagihara | A42B 3/281 |
| | | | | 2/422 |
| 6,009,563 | A * | 1/2000 | Swanson | A42B 3/10 |
| | | | | 455/100 |
| 6,081,929 | A | 7/2000 | Rothrock et al. | |
| 6,336,220 | B1 | 1/2002 | Sacks et al. | |
| 6,464,369 | B1 | 10/2002 | Vega et al. | |
| 6,691,325 | B1 | 2/2004 | Pelletier et al. | |
| 6,701,537 | B1 | 3/2004 | Stamp | |
| 7,377,666 | B1 | 5/2008 | Tyler | |
| 7,532,163 | B2 | 5/2009 | Chang et al. | |
| 7,555,312 | B2 | 6/2009 | Kim et al. | |
| 7,555,788 | B2 * | 7/2009 | Schimpf | A42B 3/326 |
| | | | | 2/410 |
| 7,901,104 | B2 | 3/2011 | McLean et al. | |
| 8,001,623 | B2 | 8/2011 | Gertsch et al. | |
| 8,009,229 | B1 * | 8/2011 | Peterson | A42B 3/185 |
| | | | | 348/376 |
| 8,245,326 | B1 | 8/2012 | Tolve | |
| 8,544,399 | B2 | 10/2013 | Miloslavsky | |
| 8,545,959 | B2 | 10/2013 | McGuire, Jr. et al. | |
| 8,667,617 | B2 * | 3/2014 | Glezerman | A42B 3/30 |
| | | | | 343/700 R |
| 8,853,105 | B2 | 10/2014 | Bhatnagar et al. | |
| 8,908,389 | B2 | 12/2014 | Teetzel et al. | |
| 9,070,978 | B2 | 6/2015 | Boni et al. | |
| 9,247,779 | B1 | 2/2016 | Aloumanis et al. | |
| 9,445,639 | B1 | 9/2016 | Aloumanis et al. | |
| 9,456,649 | B2 | 10/2016 | Basson | |
| 9,486,027 | B2 | 11/2016 | Dey et al. | |
| 9,585,433 | B1 | 3/2017 | Heimer et al. | |
| 9,686,136 | B1 | 6/2017 | Dey et al. | |
| 9,711,146 | B1 * | 7/2017 | Cronin | G10L 15/26 |
| 9,833,933 | B2 | 12/2017 | Cadens Ballarin | |
| 9,968,153 | B2 | 5/2018 | Thompson et al. | |
| 10,051,908 | B2 | 8/2018 | Redpath et al. | |
| 10,160,156 | B2 | 12/2018 | Pourboghrat et al. | |
| 10,219,571 | B1 | 3/2019 | Aloumanis et al. | |
| 10,383,384 | B2 | 8/2019 | Zhavoronkov et al. | |
| 10,779,604 | B2 | 9/2020 | Lebel et al. | |
| 10,806,204 | B2 | 10/2020 | Pritz | |
| 10,814,524 | B2 | 10/2020 | Prins et al. | |
| 10,856,599 | B1 | 12/2020 | Cuenca | |
| 11,278,076 | B2 | 3/2022 | Suddaby | |
| 11,633,303 | B2 | 4/2023 | Persson et al. | |
| 11,660,846 | B2 | 5/2023 | Drzal et al. | |
| 2005/0017911 | A1 * | 1/2005 | Lee | H01Q 1/276 |
| | | | | 343/718 |
| 2006/0232955 | A1 | 10/2006 | Labine | |
| 2006/0277664 | A1 | 12/2006 | Akhtar et al. | |
| 2007/0220662 | A1 | 9/2007 | Pierce | |
| 2007/0289044 | A1 | 12/2007 | Ellis | |
| 2008/0068825 | A1 | 3/2008 | Harris | |
| 2008/0130271 | A1 | 6/2008 | Harris | |
| 2009/0064386 | A1 | 3/2009 | Rogers | |

(56) References Cited

U.S. PATENT DOCUMENTS

| | | | |
|---|---|---|---|
| 2009/0158508 A1* | 6/2009 | Quaranta | A42B 3/0453 2/421 |
| 2009/0199317 A1 | 8/2009 | Schwiers et al. | |
| 2010/0175172 A1 | 7/2010 | Dempsey et al. | |
| 2010/0287687 A1* | 11/2010 | Ho | A42B 3/003 2/411 |
| 2011/0302701 A1* | 12/2011 | Kuo | A42B 3/326 2/421 |
| 2012/0011631 A1 | 1/2012 | Crossman et al. | |
| 2012/0077438 A1 | 3/2012 | Jung | |
| 2012/0189153 A1 | 7/2012 | Kushnirov et al. | |
| 2012/0272435 A1 | 11/2012 | Glezerman et al. | |
| 2013/0007949 A1 | 1/2013 | Kurs et al. | |
| 2013/0081199 A1 | 4/2013 | Nimura | |
| 2013/0176183 A1 | 7/2013 | Boni et al. | |
| 2013/0190052 A1 | 7/2013 | Lundell | |
| 2013/0305437 A1 | 11/2013 | Weller et al. | |
| 2014/0000013 A1 | 1/2014 | Redpath et al. | |
| 2014/0000014 A1 | 1/2014 | Redpath et al. | |
| 2014/0020159 A1 | 1/2014 | Teetzel et al. | |
| 2014/0109297 A1 | 4/2014 | Lanez | |
| 2014/0189938 A1 | 7/2014 | Redpath et al. | |
| 2014/0362244 A1* | 12/2014 | Martin | A42B 3/042 348/211.2 |
| 2015/0038199 A1 | 2/2015 | Shirashi | |
| 2015/0223547 A1 | 8/2015 | Wibby | |
| 2015/0282549 A1 | 10/2015 | Lebel et al. | |
| 2016/0100649 A1 | 4/2016 | Glezerman et al. | |
| 2016/0106174 A1 | 4/2016 | Chung et al. | |
| 2016/0249700 A1 | 9/2016 | Zhavoronkov et al. | |
| 2017/0006955 A1 | 1/2017 | Dow, II et al. | |
| 2017/0052000 A1 | 2/2017 | White et al. | |
| 2017/0367433 A1 | 12/2017 | Frett | |
| 2018/0221915 A1 | 8/2018 | Simor et al. | |
| 2018/0272928 A1 | 9/2018 | Boksteyn | |
| 2018/0289095 A1* | 10/2018 | Catterson | H04B 1/385 |
| 2019/0104797 A1 | 4/2019 | Teetzel et al. | |
| 2019/0191808 A1 | 6/2019 | Becker et al. | |
| 2019/0269193 A1 | 9/2019 | Benyola | |
| 2019/0320753 A1 | 10/2019 | Le et al. | |
| 2019/0380417 A1 | 12/2019 | Zhavoronkov et al. | |
| 2020/0015537 A1 | 1/2020 | Becker et al. | |
| 2020/0037693 A1 | 2/2020 | Klimek et al. | |
| 2020/0305532 A1 | 10/2020 | Lange et al. | |

FOREIGN PATENT DOCUMENTS

| | | |
|---|---|---|
| CN | 1715734 A | 1/2006 |
| CN | 201319192 Y | 9/2009 |
| CN | 102791157 A | 11/2012 |
| CN | 202919121 U | 5/2013 |
| CN | 104871384 A | 8/2015 |
| CN | 204949670 U | 1/2016 |
| CN | 205106513 U | 3/2016 |
| CN | 206043574 U | 3/2017 |
| CN | 106659261 A | 5/2017 |
| CN | 206312966 U | 7/2017 |
| CN | 206560075 U | 10/2017 |
| DE | 3042159 A1 | 6/1982 |
| DE | 8226935 U1 | 2/1983 |
| DE | 29519601 U1 | 2/1996 |
| DE | 29906107 U1 | 7/1999 |
| DE | 29914563 U1 | 1/2000 |
| DE | 102005038893 A1 | 3/2006 |
| DE | 202011051831 U1 | 11/2011 |
| DE | 102015216835 A1 | 3/2017 |
| DE | 102016115889 A1 | 3/2018 |
| EP | 0412205 A1 | 2/1991 |
| EP | 1393643 A1 | 3/2004 |
| EP | 2183989 A1 | 5/2010 |
| FR | 2335169 A1 | 7/1977 |
| FR | 2668901 A1 | 5/1992 |
| GB | 826012 A | 12/1959 |
| GB | 974901 A | 11/1964 |
| GB | 2059206 A | 4/1981 |
| GB | 2254528 A | 10/1992 |
| JP | S6468507 A | 3/1989 |
| JP | 2000328342 A | 11/2000 |
| JP | 2005060889 A | 3/2005 |
| JP | 2011-002958 A | 1/2011 |
| KR | 20010011095 A | 2/2001 |
| KR | 101530061 B1 | 6/2015 |
| WO | 2004032658 A1 | 4/2004 |
| WO | 2011129576 A2 | 10/2011 |
| WO | 2012006653 A1 | 1/2012 |
| WO | 2012017836 A1 | 2/2012 |
| WO | 2012148519 A1 | 11/2012 |
| WO | 2016001915 A1 | 1/2016 |
| WO | 2016022984 A1 | 2/2016 |
| WO | 2018/043025 A1 | 3/2018 |

OTHER PUBLICATIONS

International Search Report for Application No. PCT/EP2017/071259, issued Oct. 27, 2017, 3 pages.
Written Opinion for Application No. PCT/EP2017/071259, issued Oct. 27, 2017, 5 pages.
Rajpurohit, A. "Fiber Reinforced Composites: Advances in Manufacturing Techniques.", Researchgate; https://www.researchgate.net/publication/279885386. (Year: 2014).
D'Hooghe et al., Thermoplastic Composite Technology; Tougher Than You Think. Adv Mat. 2000;12(23):1865-1868.

* cited by examiner

PROTECTIVE HELMET WITH AN ANTENNA

CROSS-REFERENCE TO RELATED APPLICATIONS

This application is a national stage application of international application no. PCT/EP2017/071259 filed Aug. 23, 2017, entitled "Protective Helmet with an Antenna," claiming priority to German application no. DE 10 2016 115 889.8 filed Aug. 26, 2016, which are hereby expressly incorporated by reference as part of the present disclosure.

FIELD OF THE INVENTION

The disclosure generally relates to a protective helmet having an antenna.

BACKGROUND

Wearing a protective helmet is required for many activities, inter alia, as a rule, when riding on a motorcycle. It is not only such a protective helmet with its safety-related and extensive coverage of the head of the driver, but also the noise produced by the engine of the motorcycle and the travel-related noise, which, in practice, make non-amplified oral communication between motorcyclists difficult or impossible during travel.

In the course of recent technical developments, wireless radio connections between the motorcyclists and corresponding assemblies of microphones and headsets enable communication of motorcyclists amongst each other, even in a larger group and during travel. The Bluetooth protocol especially has proved to be a suitable basis for forming communication networks within a respective group of motorcyclists. In this case, the maximum possible distance between the communication participants constitutes a potential disadvantage. The distance between the individual motorcyclists within a group may vary greatly during travel. In addition, the antenna in many Bluetooth modules for arrangement on a motorcycle helmet is dimensioned or positioned in such a way that the obtainable range stays below the values that are actually possible.

In this connection, the prior art WO 2012/148519 A1 proposes a protective helmet with an integrated antenna. Specifically, the integrated antenna is in this case to be accommodated in the inner layer, which inner layer is surrounded by the outer shell and is supposed to dampen any occurring impact forces. This assembly is supposed to enable the use of an antenna without any narrow constraints with regard to its length with a protective helmet.

However, the arrangement of the antenna in the inner layer, and thus inside the outer shell, is disadvantageous, on the one hand, with regard to the emission from the antenna towards the wearer of the helmet. In the same context, an attenuation of the antenna radiation on the way to the other communication participants is produced by the outer shell as well, which may, inter alia, limit the possible range of the antenna.

SUMMARY

It is an object to develop and improve the protective helmet with an antenna so as to result in more favorable emission properties both with regard to the wearer of the protective helmet as well as with regard to the communication partners of the antenna.

Placement of the antenna in such a way that at least a part of the outer shell is disposed between the antenna and the inner layer is advantageous for the emission of the antenna. The outer shell, which as such interferes with the transmission from the antenna, in this way tends to shield the wearer of the protective helmet, or his head, from the emission. Conversely, the outer shell does not interfere, or only to a small extent, with the actually intended transmission to the other communication participants. Additionally, even though the modern antennas are configured to be rather small and light, the arrangement of such a component outside the outer shell, based on fundamental considerations, is nevertheless advantageous also with respect to the aspect of mechanical safety.

The protective helmet according to at least some embodiments, which may be, in particular, a protective motorcycle helmet, comprises an antenna for radio transmission, an outer shell for distributing impact forces, and an inner layer, which is accommodated by the outer shell, for damping impact forces. Consequently, the inner layer is disposed within the outer shell and, as a rule, consists of a softer material than the outer shell. Both the outer shell and the inner layer may consist of several layers or plies, wherein it is essential for the respective association with the outer shell or with the inner layer, whether the respective layer or ply serves for distributing or damping impact forces.

The protective helmet according to at least some embodiments further comprises a socket, which is firmly connected to the outer shell, for contacting a digital device, which digital device is configured for wireless communication. In at least some embodiments, the digital device has electronic logic components for implementing a wireless communication protocol. The connection of the socket to the outer shell may in this case be direct, however, it may also be carried out indirectly via interposed components. In the protective helmet according to the invention, the socket, when contacting the digital device, electrically connects the latter— i.e. the digital device—to the antenna for wireless communication. In this way, the digital device is able to employ the antenna for wireless communication. The protective helmet may also have further antennas. The latter may then be electrically connected with the digital device, which can separately, when the digital device is contacted. It is also conceivable that, in that case, further sockets are provided for these additional antennas.

The protective helmet according to at least some embodiments is characterized in that at least a partial layer of the outer shell is disposed between the antenna and the inner layer. This means that at least a part of the outer shell is disposed between every portion of the antenna along the substantially entire length of the antenna and the inner layer. In other words, there is no portion of the antenna which— without a part of the outer shell being interposed—is directly adjacent to the inner layer. In this way, the outer shell is used at least partially for attenuating the radiation emitted towards the wearer of the protective helmet, wherein the attenuation with respect to a transmission to the other communication participants is avoided to the same extent. An antenna in the present sense is understood to be the structure which, when used as intended, is configured for emitting and receiving corresponding signals. Consequently, electrical lines, which may possibly have a substantially smaller and parasitic emitting and receiving output in comparison, do not count among antennas in this sense.

According to some embodiments of the protective helmet, it is provided that the antenna is disposed outside the outer shell. In that case, it would not only be a partial layer of the outer shell that is disposed between the antenna and the inner layer, but rather, all layers of the outer shell, and thus the outer layer as a whole, would be disposed between the antenna and the inner layer. Furthermore, according to at least some embodiments, the antenna is substantially configured for emitting in a horizontal transmission direction. In this case, the relative transmission direction of the antenna is generally determined by its type and geometry. In this case, the directional indication "horizontal" refers to the protective helmet in the state of it being worn by a person.

However, the antenna may also be surrounded by the outer shell. In particular, this may be the case if the outer shell has a plurality of outer shell layers and the antenna is disposed between the outer shell layers.

In at least some embodiments the antenna contacts the outer shell along an entire length of the antenna.

In principle, the antenna and digital device may be used for any type of digital wireless communication. However, at least some embodiments of the protective helmet are characterized in that the digital device is a radio module for a Wireless Personal Area Network (WPAN). In this case, the digital device may be, for example, a radio module for Bluetooth.

Another embodiment of the protective helmet is characterized in that the socket has a frame for accommodating the digital device and a transmission device for signal transmission, which is electrically connected to the antenna, and that, when the digital device is accommodated in the frame, the transmission device is electrically coupled to an antenna pole of the digital device. In principle, this transmission device is also capable of establishing a contactless electrical coupling, e.g. an inductive electrical coupling, with the antenna pole. In at least some embodiments, the transmission device is a contact device, and that, when the digital device is accommodated in the frame, the contact device electrically contacts the antenna pole, which may be an antenna contact. Accordingly, the result is the contact device and the antenna contact touching each other.

Thus, the digital device is also accommodated mechanically by the socket or its frame. In at least some embodiments, the frame is configured for attaching the digital device to the outer shell when accommodating the digital device. In this case, the socket may also comprise a locking means for retaining the digital device in the socket. Not only can a secure attachment of the digital device to the protective helmet be ensured in this manner, but also a reliable electrical contact of the digital device with the antenna.

According to at least some embodiments of the protective helmet, it is provided that the antenna is a dipole antenna. Accordingly, the transmission device, and the contact device, may be a coaxial plug-in device with at least two contact poles. Thus, the digital device may have an antenna contact, which is a coaxial contact and has at least two coaxial contacts.

At least some embodiments of the protective helmet are characterized in that the antenna, with respect to a transverse direction of the protective helmet, is disposed substantially at an outer transverse end of the protective helmet. Here and hereinafter, the term "transverse direction" is to be understood in relation to a longitudinal direction of the protective helmet, which longitudinal direction corresponds to the—straight—viewing direction of a person wearing the helmet. Thus, the transverse direction is a horizontal direction in the above sense, which, furthermore, extends substantially perpendicularly to the longitudinal direction. Such a placement of the antenna has proved to be suitable with respect to the emission of the antenna.

Another embodiment of the protective helmet is characterized in that the protective helmet has a transmission line for electrically connecting the digital device to the antenna. Since this transmission line does not play an essential role for emitting or receiving signals, it does not itself belong to the antenna in the sense of the present subject matter. In principle, such a transmission line may be arranged in any way. However, the transmission line may be routed at least partially inside the outer shell. The transmission line may also be routed completely inside the outer shell. The transmission line therefore could also be—completely or partially—routed between the outer shell as a whole and the inner layer. In other words, the transmission line could be routed at least in some sections between the outer shell and the inner layer.

If the transmission line is routed inside the outer shell, it is still to be contacted with the antenna, wherein in that case, at least the partial layer of the outer shell would have to be traversed in a basically arbitrary manner. In this case, at least some embodiments of the protective helmet provide that the outer shell has an opening, and that the transmission line for the electrical connection is routed through the opening.

According to at least some embodiments of the protective helmet, it is provided that the opening is disposed in a lower half of the outer shell. Also in this case, the directional indication "lower" relates to an orientation of the protective helmet when worn by a person. In this manner, the transmission line can be configured to be comparatively short, given a favorable positioning of the antenna.

This applies particularly if the socket is disposed at a lower edge of the protective helmet. Moreover, the socket may be disposed laterally offset with respect to a vertical center plane in the longitudinal direction of the protective helmet. Here and hereinafter, the directional indication "vertical" also relates to the orientation of the protective helmet when worn by a person. In other words, the socket is not disposed centrally in the transverse direction, but rather offset. This facilitates the operation of the digital device by operating members, such as pushbuttons, disposed on the digital device. In this context, the above opening may be disposed on the same side-half of the outer shell as the socket.

At least some embodiments of the protective helmet are characterized in that the protective helmet has a cover disposed on the outer shell, and that the antenna is at least partially disposed between the outer shell and the cover. The antenna may also be completely disposed between the outer shell and the cover. In this manner, the antenna is better protected against damage by external mechanical influence. The cover may comprise plastic or consist of plastic. Since the cover, as a rule, does not have a protective effect with requirements as demanding as in the case of the outer shell, the influence on the emission of the antenna is also much smaller, as a rule.

Another embodiment of the protective helmet is characterized in that the protective helmet has a visor for eye protection and a visor attachment means, which is firmly connected to the outer shell, for pivotably mounting the visor. Such a visor and such a visor attaching means are known per se from the prior art. In this case, it may be provided that the cover is disposed adjacent to the visor attaching means. This allows for various advantageous synergies between the cover and the visor attaching means, which are explained in more detail below. These advantageous synergies arise when the cover is disposed substantially offset from the visor attaching means in an opposite direction to the viewing direction of the protective helmet.

In this case, the viewing direction is oriented along the longitudinal direction and aligned with the direction of sight of a person wearing the protective helmet.

According to at least some embodiments of the protective helmet, it is provided that the cover is attached to the visor attaching means. Since the visor attaching means has to ensure a secure attachment of the visor to the outer shell anyway, this attaching effect of the visor attaching means can also be used by the cover without any separate engagement with the outer shell being required, which engagement generally necessitates weakening the outer shell by drill holes or the like. Furthermore, the opening may be disposed underneath the visor attaching means, wherein, the visor attaching means in that case may have a through-hole aligned with the opening for routing the transmission line through the opening. In this way, the work on the outer shell required for passing the transmission line through can be limited to the region of the visor attaching means, which has to be configured separately, anyway.

According to another embodiment of the protective helmet, it is provided that the cover has an aerodynamics device (which may be integrally configured) for influencing the air flow about the protective helmet during travel. Thus, the cover has not only the function of protecting the antenna against external mechanical influence, but it also influences the aerodynamic behavior of the protective helmet advantageously. In this case, the cover may have turbulators for generating air vortices during travel. These turbulators may be bulges in the cover, which are configured to be elongate and substantially extend in the longitudinal direction. In a manner known per se from the prior art, such turbulators are configured for converting a laminar air flow, which is produced in the present case by the traveling air, into a turbulent air flow. In the case of a protective helmet, they serve for minimizing the noise produced by the traveling air.

In at least some embodiments, the protective helmet has a structure disposed on the outer shell, which structure, compared to the outer shell, results in a contoured surface profile of the protective helmet, and that the aerodynamics device is disposed adjacent to the structure in such a manner that the surface profile resulting because of the aerodynamics device is smoothed compared to the contoured surface profile. Consequently, the structure is not a part of the outer shell. For reasons of aerodynamics, especially contours or the like protruding abruptly from the surface of the protective helmet are to be avoided in a protective helmet as a matter of principle. In certain regions, e.g. in the region of the visor attaching means, such structures cannot be entirely avoided. In principle, the outer shell could also be shaped such that it compensates the irregularities arising from such a structure. Generally, however, it is easier, as regards production, if this is done by the aerodynamics device. In at least some embodiments, this structure is the visor or the visor attaching means.

At least some embodiments of the protective helmet are characterized in that the outer shell has ventilation openings—which may be disposed in a ceiling region of the protective helmet—for feeding traveling air for cooling into the protective helmet, and that the cover is a feeding device, which covers the ventilation openings, for diverting the traveling air. In this case, the ceiling region corresponds to the upper half of the protective helmet—again relative to an orientation when the protective helmet is worn by a person—and to the region of the protective helmet or the outer shell located above a head of a person wearing the protective helmet. It is known per se from the prior art to provide ventilation openings in protective helmets in this region.

Here, the feeding device, which is also generally provided and which is configured for diverting traveling air specifically through the ventilation openings, can also be used for covering the antenna. In at least some embodiments, the feeding device is adjustable for a variable feed of traveling air, so that thus, the amount of traveling air fed to the ventilation openings is variable.

This summary is not exhaustive of the scope of the present aspects and embodiments. Thus, while certain aspects and embodiments have been presented and/or outlined in this summary, it should be understood that the present aspects and embodiments are not limited to the aspects and embodiments in this summary. Indeed, other aspects and embodiments, which may be similar to and/or different from, the aspects and embodiments presented in this summary, will be apparent from the description, illustrations, and/or claims, which follow.

It should also be understood that any aspects and embodiments that are described in this summary and do not appear in the claims that follow are preserved for later presentation in this application or in one or more continuation patent applications.

BRIEF DESCRIPTION OF THE DRAWINGS

Other advantages will become apparent from the following description and with reference to the Figures, which are understood not to be limiting.

DETAILED DESCRIPTION

Figure 1:
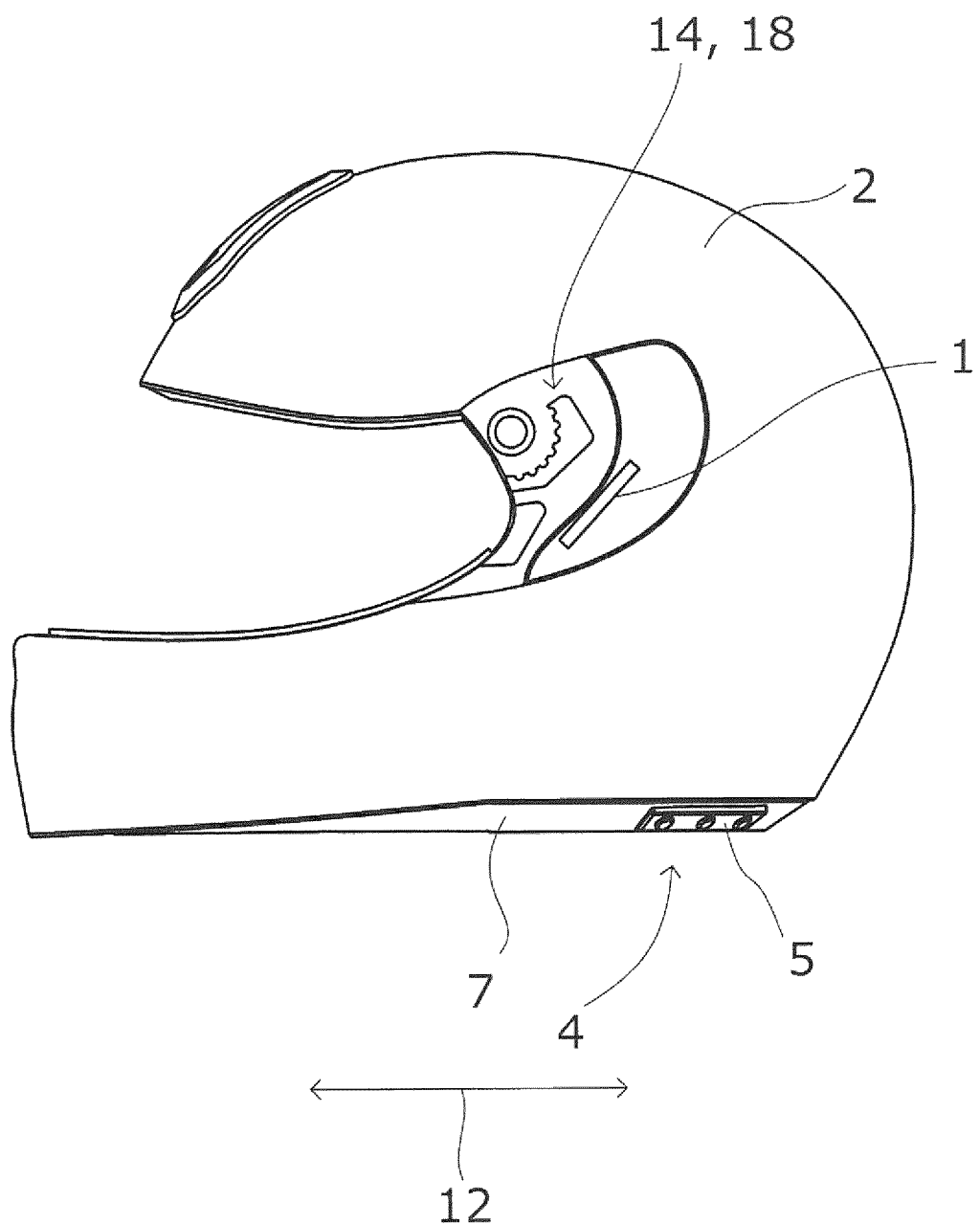
FIG. 1 shows a schematic side view of a first exemplary embodiment of a proposed protective helmet.

The, altogether, three exemplary embodiments of protective helmets shown in FIGS. 1 to 4 are protective motorcycle helmets. They comprise an—in each case differently positioned—antenna 1 for radio transmission, an outer shell 2 for distributing impact forces and an inner layer 3 for damping impact forces, which is disposed underneath—i.e. inside—the outer shell 2. In the present case, the outer shell 2 consists of glass fibers with an added special resin, and the inner layer 3 consists of expanded polystyrene (EPS). In the following, the exemplary embodiment of FIG. 1 will in each case be described first, and—where there are differences—the exemplary embodiments of FIG. 3 and FIG. 4 will be discussed separately.

Also, the protective helmets shown each include a socket 4 for contacting a digital device 5, which is a Bluetooth module, i.e. a device for communication with a Bluetooth WPAN.

Figure 2:
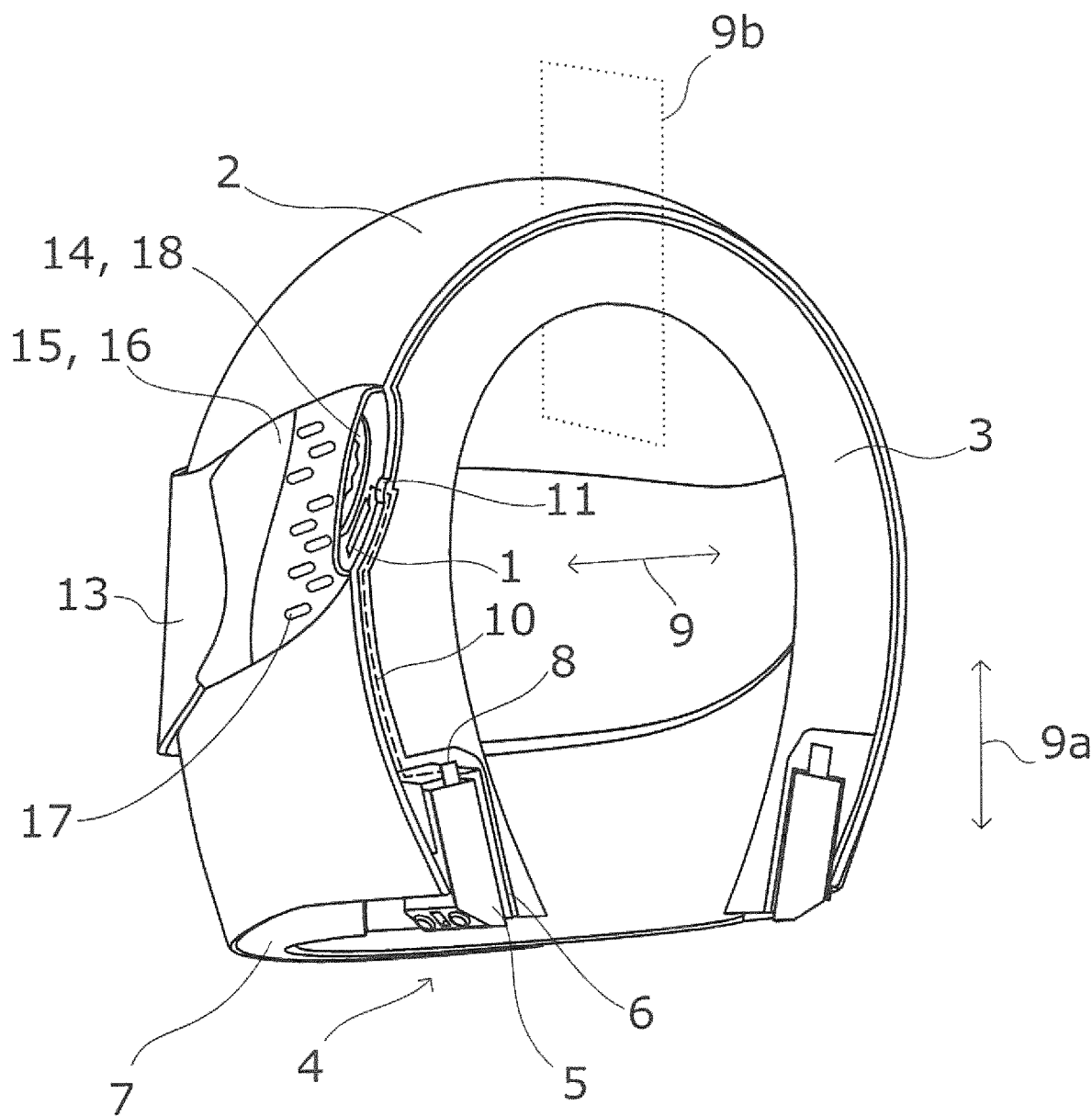
FIG. 2 shows a schematic cross-sectional view of the protective helmet of FIG. 1.
Figure 3:
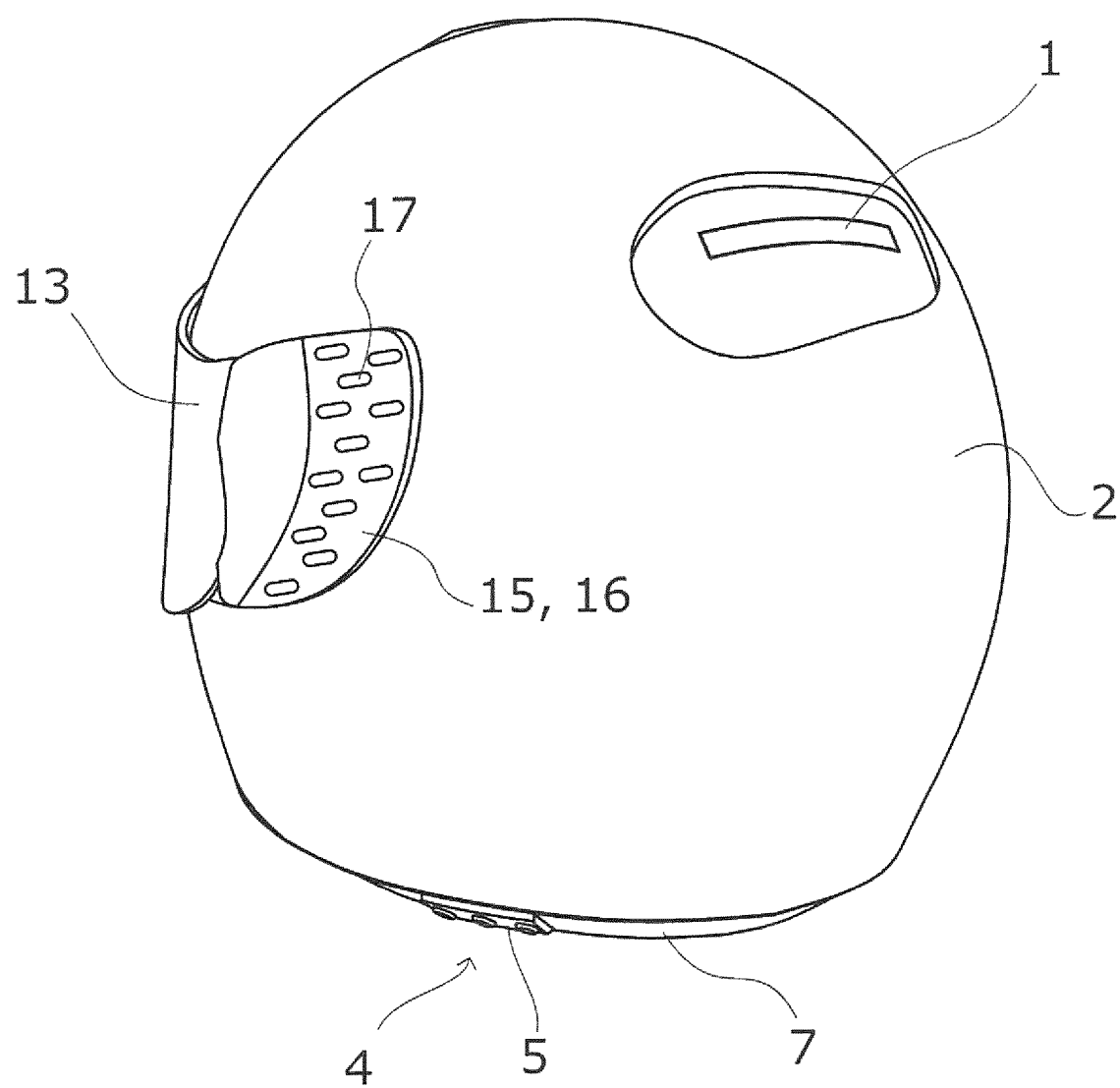
FIG. 3 shows a schematic perspective view of a second exemplary embodiment of a proposed protective helmet.
Figure 4:
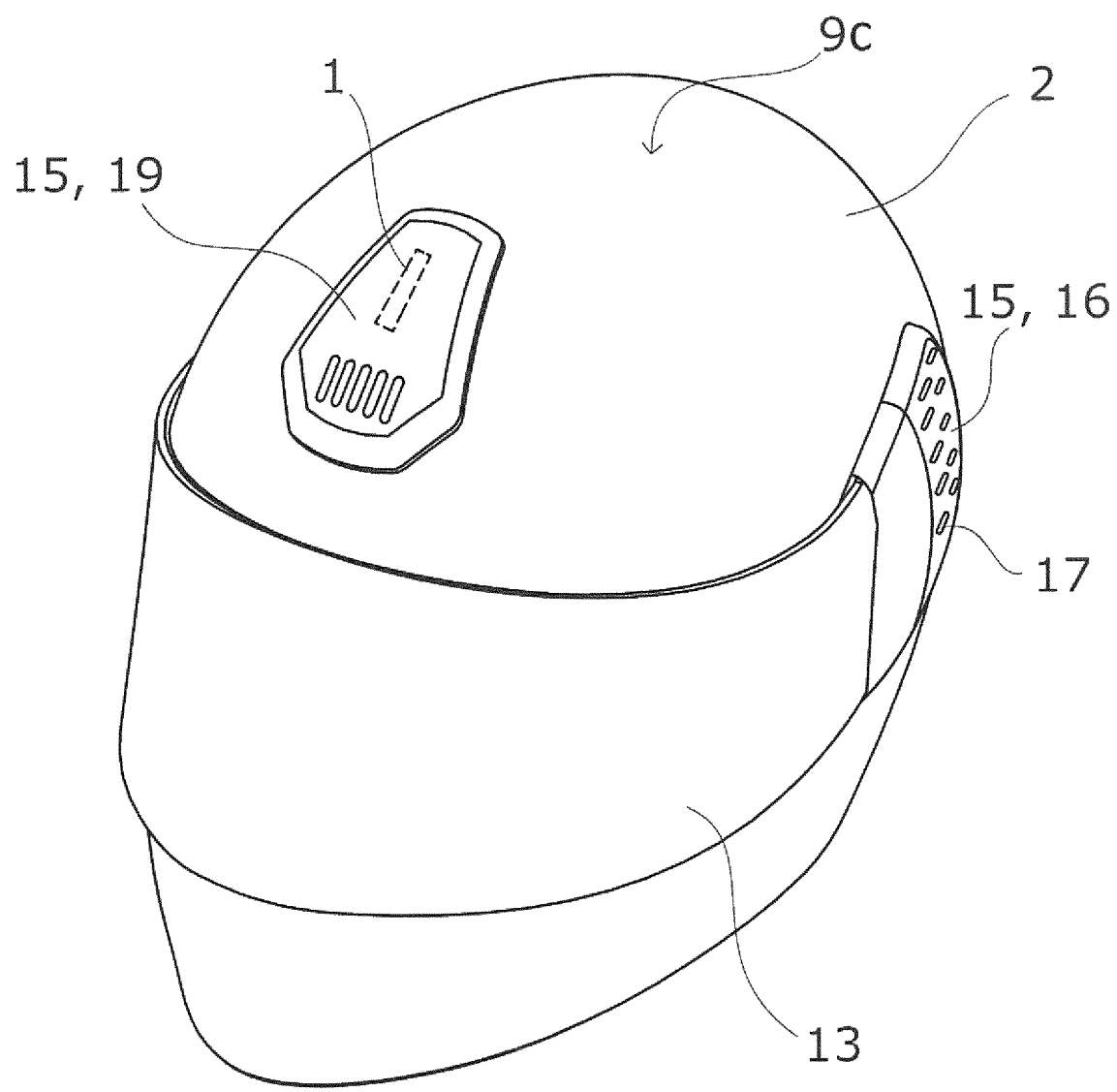
FIG. 4 shows a schematic perspective view of a third exemplary embodiment of a proposed protective helmet.

In the first—FIGS. 1 and 2—and the third—FIG. 4—embodiments, the antenna 1 is disposed in its entirety on the outside of the outer shell 2, so that the outer shell 2 completely separates the respective antenna 1 from the inner layer 3. In the second exemplary embodiment of FIG. 3, however, the antenna 1 is disposed inside the outer shell 2, so that the antenna 1 is surrounded by the outer shell 2 in all directions.

The socket 4 has a plastic frame 6, which is schematically illustrated in FIG. 2 and which is positively connected to a helmet trim 7 of the protective helmet, which in turn covers the lower edge of the outer shell 2 and is coupled to the outer shell 2. In this manner, the frame 6 is firmly connected to the outer shell 2 in an indirect manner.

Also, the socket 4 includes a coaxial plug-in device—which is illustrated here only in a schematic manner—as a contact device and transmission device 8. This transmission device 8 serves for contacting an antenna contact of the accommodated digital device 5 and is electrically connected to a transmission line 10 via which the digital device 5 is connected to the antenna 1. In this way, the digital device 5 is able to employ the antenna 1 for its Bluetooth transmission.

A synopsis of FIGS. 1 and 2 shows that, in the first exemplary embodiment, the antenna 1 is not only disposed laterally, but even at an outer—and, in particular, left-hand outer-transverse end of the protective helmet. The socket 4 is also disposed in a laterally offset manner. The corresponding transverse direction 9 is shown in FIG. 2, and a longitudinal direction 12 is shown in FIG. 1. In contrast, the antenna 1 of the protective helmet from FIG. 4 is disposed centrally in the transverse direction 9 and, instead, in a ceiling region 9c of the protective helmet in a height-wise direction 9a, which is only shown in FIG. 2. Also, FIG. 2 shows a vertical central longitudinal plane 9b corresponding to the above longitudinal direction 12 and the height-wise direction 9a.

The transmission line 10 is disposed between the inner layer 3 and the outer shell 2 and routed from the transmission device 8 to an opening 11 in the outer shell 2, through which it exits from the outer shell 2 and then contacts the antenna 1. The corresponding course of the transmission line 10 and the placement of the opening 11, in the present case, are shown only for the first exemplary embodiment in FIG. 2.

The protective helmets shown each have one visor 13—which is not shown only in the view of FIG. 1—and a visor attaching means 14, which is attached to the outer shell 2 and on which the visor 13 is pivotably mounted. Furthermore, at least one cover 15 is disposed on the outer shell 2, wherein the exemplary embodiment of FIG. 4 has two such covers 15.

In the exemplary embodiments of FIGS. 1 and 2 as well as 4, the antenna 1 is completely disposed between such a cover 15 and the outer shell 2. From FIG. 2, it can be seen that in the first exemplary embodiment, the opening 11 is also located under the cover 15.

The—single—cover 15 of the exemplary embodiment of FIGS. 1 and 2 and of the exemplary embodiment of FIG. 3 is an aerodynamics device 16. The latter is disposed adjacent to the visor attaching means 14—to which it is also attached—and smooths the rougher surface profile in the region of the visor attaching means 14 otherwise caused by the visor 13 and the visor attaching means 14. In addition, the aerodynamics device 16 has turbulators 17 for reducing the development of noise. The aerodynamics device 16 is attached to the visor attaching means 14 and thus shares the latter's attachment to the outer shell 2. Accordingly, in the first exemplary embodiment, the visor attaching means 14 is a structure 18 in the above-described sense, which as such results in a contoured surface profile.

In contrast, the cover 15 of the third exemplary embodiment of FIG. 4 is an adjustable feeding device 19, by means of which traveling air can be diverted in such a way that it enters through ventilation openings in the outer shell 2—which are not shown here—for cooling purposes.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

The invention claimed is:

1. A protective helmet, comprising:
an antenna configured for radio transmission,
an outer shell configured for distributing impact forces,
a vertically lower edge defining an opening configured for insertion of a person's head therethrough to wear the helmet,
an inner layer located within the outer shell, configured for damping impact forces,
a digital device, and
a socket connected to the outer shell, configured for contacting the digital device and electrically connecting the digital device to the antenna for wireless communication when the socket contacts the digital device,
wherein the antenna contacts the outer shell along an entire length of the antenna; and at least a partial layer of the outer shell is located between the antenna and the inner layer;
wherein the helmet defines a longitudinal centerline of the helmet and a transverse direction extending laterally relative to a vertical longitudinal plane of the helmet, wherein the longitudinal vertical plane extends along the longitudinal centerline of the helmet in a viewing direction of a person when wearing the helmet; and
wherein the antenna is located laterally in the transverse direction relative to the vertical longitudinal plane and, with respect to the transverse direction, substantially at an outer transverse end of the protective helmet,
wherein the outer transverse end is configured to be positioned adjacent to an ear of a person when wearing the helmet.

2. The protective helmet according to claim 1, wherein the antenna is located outside the outer shell.

3. The protective helmet according to claim 1, wherein the digital device defines a radio module for a Wireless Personal Area Network (WPAN).

4. The protective helmet according to claim 1, wherein the socket has a frame configured for housing the digital device and a transmission device configured for signal transmission, wherein the transmission device is electrically connected to the antenna, and when the digital device is housed in the frame, the transmission device is electrically coupled to an antenna pole of the digital device.

5. The protective helmet according to claim 1, wherein the antenna defines a dipole antenna.

6. The protective helmet according to claim 1, wherein the protective helmet has a transmission line configured for electrically connecting the digital device to the antenna.

7. The protective helmet according to claim 6, wherein the outer shell has an opening, and the transmission line is routed through the opening.

8. The protective helmet according to claim 7, wherein the socket is located at a lower edge of the protective helmet.

9. The protective helmet according to claim 1, wherein the protective helmet has a cover located on the outer shell, wherein the antenna is at least partially located between the outer shell and the cover.

10. The protective helmet according to claim 9, further comprising:
a visor configured for eye protection, and
a visor attachment device connected to the outer shell, configured for pivotably mounting the visor.

11. The protective helmet according to claim 10, wherein the cover is attached to the visor attachment device.

12. The protective helmet according to claim 9, wherein the cover has an integrally configured aerodynamics device configured for redirecting air flow about the protective helmet during travel.

13. The protective helmet according to claim 12, wherein the protective helmet has a structure located on the outer shell defining a contoured surface profile of the protective helmet relative to the outer shell, wherein the aerodynamics device is located adjacent to the structure and defines a smoothed surface profile relative to the contoured surface profile.

14. The protective helmet according to claim 13, wherein the outer shell has ventilation openings configured for feeding cooling traveling air into the protective helmet, and wherein the cover defines a feeding device covering the ventilation openings for diverting the traveling air.

15. The protective helmet according to claim 1, wherein the protective helmet is a protective motorcycle helmet.

16. The protective helmet according to claim 2, wherein the antenna is configured for emitting in a substantially horizontal transmission direction.

17. The protective helmet according to claim 3, wherein the digital device defines a radio module for Bluetooth communication.

18. The protective helmet according to claim 5, wherein the transmission device defines a coaxial plug-in device with at least two contact poles.

19. The protective helmet according to claim 6, wherein the transmission line is routed at least partially inside the outer shell.

* * * * *